United States Patent
Saarinen et al.

(10) Patent No.: US 6,898,416 B2
(45) Date of Patent: May 24, 2005

(54) DEVICE AND METHOD FOR MEASURING THE USAGE OF SYSTEM RESOURCES IN A COMMUNICATION NETWORK

(75) Inventors: Matti Saarinen, Tampere (FI); Seppo Isojarvi, Ylöjärvi (FI); Jari Tiitinen, Espoo (FI); Mikko Ohvo, Numminen (FI); Petri Aalto, Pirkkala (FI); Armi Mensio, Vantaa (FI); Markku Rantanen, Ääanekoski (FI)

(73) Assignee: Nokia Corporation, Espoo (FI)

( * ) Notice: Subject to any disclaimer, the term of this patent is extended or adjusted under 35 U.S.C. 154(b) by 35 days.

(21) Appl. No.: 10/045,323

(22) Filed: Oct. 25, 2001

(65) Prior Publication Data

US 2002/0115413 A1 Aug. 22, 2002

Related U.S. Application Data

(63) Continuation of application No. PCT/EP99/03045, filed on May 4, 1999.

(51) Int. Cl.$^7$ ............................................. H04B 17/00
(52) U.S. Cl. ...................... 455/67.1; 455/453; 455/405; 455/423; 455/226.1; 370/252
(58) Field of Search ................................. 455/405, 422, 455/423, 424, 425, 67.1, 115, 226.1–226.3, 450, 453, 560, 561, 550, 446; 370/252

(56) References Cited

U.S. PATENT DOCUMENTS

| | | | |
|---|---|---|---|
| 5,285,494 A | | 2/1994 | Sprecher et al. |
| 5,946,612 A | * | 8/1999 | Johansson ................... 455/405 |
| 6,163,700 A | * | 12/2000 | Hussain et al. ............. 455/453 |
| 6,167,031 A | * | 12/2000 | Olofsson et al. ............ 370/252 |
| 6,256,490 B1 | * | 7/2001 | Yost et al. ................... 455/405 |
| 6,289,217 B1 | * | 9/2001 | Hamalainen et al. ........ 455/425 |
| 6,311,054 B1 | * | 10/2001 | Korpela ....................... 370/238 |
| 6,356,739 B1 | * | 3/2002 | Ranta ........................ 455/437 |
| 6,359,557 B2 | * | 3/2002 | Bilder ........................ 340/531 |
| 6,377,817 B1 | * | 4/2002 | Hakaste et al. ............. 370/252 |
| 6,442,401 B1 | * | 8/2002 | Behan ..................... 455/552.1 |
| 2002/0155831 A1 | * | 10/2002 | Fodor et al. ............... 455/426 |

FOREIGN PATENT DOCUMENTS

WO WO 97/12490 4/1997

* cited by examiner

*Primary Examiner*—Nay Maung
*Assistant Examiner*—Edan Orgad
(74) *Attorney, Agent, or Firm*—Squire, Sanders & Dempsey L.L.P.

(57) ABSTRACT

Disclosed herein is a method and apparatus for measuring usage of system resources in a communication network. The apparatus includes devices for measuring radio resources, data service units and transmission characteristics in the system. The devices for measuring are adapted for performing a respective collective measurement. The method includes collectively measuring transmission parameters including radio resources, data service units and transmission characteristics. The method provides for dimensioning system resources according to transmission demand in the network.

16 Claims, 1 Drawing Sheet

DEVICE AND METHOD FOR MEASURING THE USAGE OF SYSTEM RESOURCES IN A COMMUNICATION NETWORK

This application is a continuation of international application serial number PCT/EP99/03045, filed 4 May 1999.

FIELD OF THE INVENTION

The present invention relates to a device and method for measuring the usage of system resources in a communication network. Furthermore, the present invention relates to a method for dimensioning system resources for a usage by transmissions in a system.

RELATED BACKGROUND ART

In the field of mobile telecommunications, there is right now the opportunity to provide new mobile services which are beyond voice transmission. These messaging services are, however, presently limited to a transmission rate of 9,6 kbit/s.

Therefore, proposals for new technologies have been made how to increase the transmission bit rates. The solution for a packet switched data submission will most presumably be the General Packet Radio Service (GPRS) which is mainly intended for the interconnection to packet switched networks such as the Internet. However, for the connectivity to the existing circuit switched networks, the Integrated Services Digital Network (ISDN) and the Public Switched Telephone Network (PSTN), one of the mostly favored solution is the High Speed Circuit Switched Data (HSCSD) technology.

The reason therefor is that HSCSD enables the co-allocation of multiple full rate traffic channels into a HSCSD configuration. The aim of HSCSD is to provide a mixture of services with different air interface user rates by a single physical layer structure. The available capacity of a HSCSD configuration is several times the capacity of a full rate traffic channel, leading to a significant enhancement in the air interface data transfer rate.

Moreover, HSCSD uses a new channel coding scheme to enhance the bit rate of one time-slot from 9,6 kbit/s to 14,4 kbit/s. This increase is achieved by puncturing error correction bits of the 9,6 kbit/s channel coding. Hence, the transmission speed of only one time slot is 50% faster.

Thus, by combining these two features of HSCSD, a maximum HSCSD bit rate of 57,6 kbit/s uncompressed is available, which is comparable to one ISDN B-channel. Accordingly, when HSCSD is introduced, GSM data will be on par with existing PSTN modem services. For the technical specification of HSCSD, reference is made to document GSM 03.34 of the European Standards Telecommunications Institute.

However, the HSCSD technology is unfortunately associated with some problems. Since HSCSD uses several time slots for a single communications session, this multi-slot occupation is a heavy load for a single cell. Accordingly, when planning the provision of resources for the cells of a network, the traffic density of the network has to be taken into account. Since to date there is assumed a statistical distribution of the traffic density over time and space, this suffers from another significant drawback: If many subscribers use HSCSD simultaneously and thus occupying a rather huge amount of time slots, the actual traffic distribution can change considerably, probably leaving no time slot left for a later caller.

In addition, an introduction of new channel codings generally requires respective capabilities (e.g. hardware) to be implemented in a suitable location in a communication network.

SUMMARY OF THE INVENTION

Therefore, it is an object of the present invention to provide a device for measuring the usage of system resources in a communication network which is free from the above drawbacks.

According to the present invention, this object is achieved by a device for measuring a usage of system resources in a communication network, said device comprising means for measuring which radio resources are used by a transmission in a system; means for measuring which data service units are used for said transmission in a system; and means for measuring which transmission characteristics are used by said transmission in a system, wherein all of said means are adapted for a respective collective measurement.

Furthermore, the object is achieved by a method for measuring a usage of system resources in a communication network, said method comprising the step of measuring parameters of circumstances of a transmission in a system, said parameters being at least radio resources used by said transmission in a system, data service units used for said transmission in a system, and transmission characteristics used by said transmission in a system, wherein said measuring is carried out collectively.

Advantageous further developments of the present invention are as set out in the respective dependent claims.

Hence, it is an advantage of the present invention that the device and method for measuring a usage of system resources in a communication network by a transmission provide a collective and thus dependent measurement of the load distribution in the communication network. Thus, according to the invention, there is provided most accurate information about any system resource dependencies in the communication network during a transmission. Consequently, the distribution of the load on the system resources during a transmission, particularly with respect to those dependencies, can be achieved. Stated in other words, the invention can provide an unambiguous identification of the system resource usage by a transmission in a system.

Accordingly, this invention provides a helpful tool for dimensioning system resources in communication networks by evaluating these overall characteristics. Particularly, the problems encountered by the usage of high speed circuit switched data or other new channel codings to be introduced can be effectively met when adopting the invention. Therefore, by incorporating an analysis according to this invention to the existing GSM network can help to pave the way for the introduction of HSCSD and other new channel codings to be introduced.

Preferred embodiments of the present invention are described herein below in detail by way of example with reference to the accompanying drawings.

DESCRIPTION OF THE PREFERRED EMBODIMENTS

Figure 1:
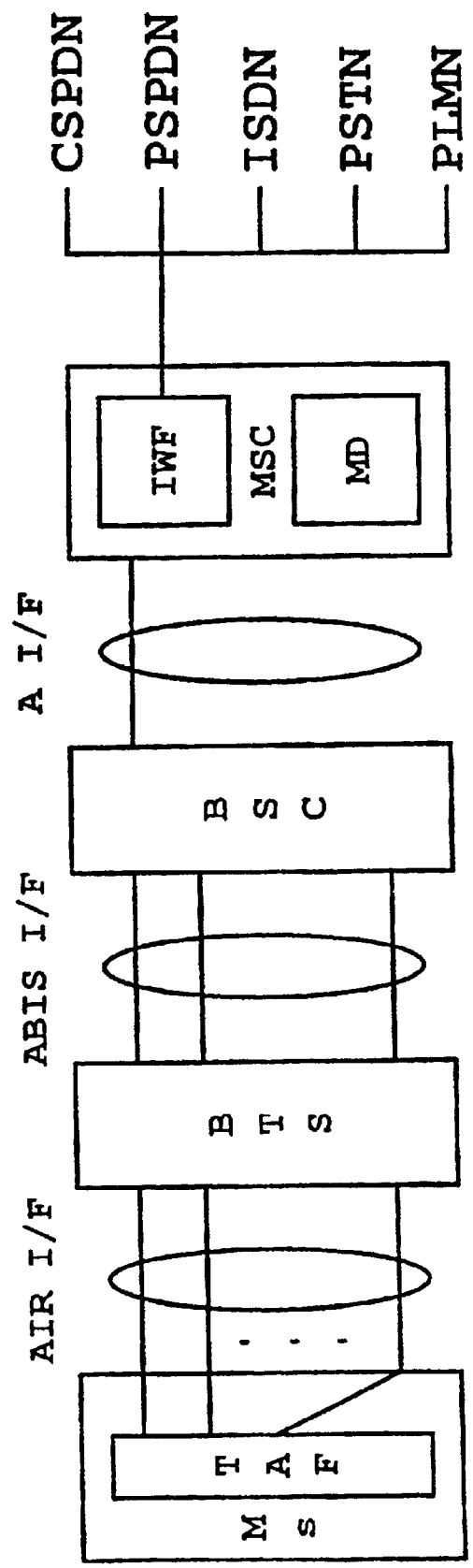
FIG. 1 shows a communication network architecture for supporting high speed circuit switched data having incorporated the device according to a preferred embodiment of the invention.

According to the present invention, a usage of system resources in a communication network is measured collectively, thereby detecting all occurring dependencies under the used system resources, such as hardware, frequency bands, traffic channels, or the like. The expression "system" is used in this description as a term superior to a network, i.e. a system can for example be two or more networks constituting a communication system.

Circumstances of a transmission in a system are defined at least by radio resources used by the transmission in a system, data service units used by the transmission in a system and transmission characteristics used by the transmission in a system. Other parameters for defining the circumstances of a transmission in a system are conceivable, but the description of the present invention should here be left being limited to these three examples for parameters of the circumstances of a transmission in a system for the sake of distinctness. It is noted that the term circumstance of a transmission in a system is also meant to include also bearer service characteristics.

From later given examples for the parameters and their description it can easily be seen that the usage of system resources in the system will be strongly dependent on the above mentioned parameters of the circumstances of a transmission in a system. Stated in other words, every different type of transmission will use the available system resources in a communication network to a different extent. To date, there are already a lot of transmission types present, like voice calls, emails, file transfer, and the like, whose system resource load might be foreseeable, but rather be dependent on characteristics of the respective sender-receiver pair. Anyway, the ratio of all thinkable transmission types and the respective circumstances of their transmission in a system to each other with regard to their distribution over time and space is surely not foreseeable and thus needs an accurate analysis, particularly when additionally taking the above mentioned problems with an introduction of HSCSD or other new channel codings into account.

The basic idea to provide such an analysis is to add a device for measuring the usage of the system resources in the system to the respective communication network. Therein, the measurement is done collectively, so that any respective dependency of that system resource usage is detected and identified. By evaluating the thus provided analysis data, one could perform a very precise dimensioning method for system resources in a communication network, particularly in view of the introduction of novelties of any kind to the communication network.

Apart from the example of HSCSD, which will be referred to herein below, there is a further example of a new channel coding method called Enhanced Data rates for GSM Evolution (EDGE). The present invention is also applicable to that, since the EDGE channel coding also uses a dynamical system resource load and architecture proposals in ETSI change requests reuse HSCSD principles. Thus, very similar problems and respective solutions according to this invention as discussed herein can apply to the EDGE channel coding.

As can be seen from the foregoing, the present invention has a broad scope for an adoption in any communication network/system encountering the above outlined problems. However, the further description of the present invention will be made by the example of High Speed Circuit Switched Data HSCSD in GSM networks for the sake of explanation. Nevertheless, it is expressly mentioned that the present invention is not limited thereto.

With reference to the above mentioned explanations about the HSCSD and its functionality in GSM networks there are now some examples for circumstances of the operation of the device according to the invention and its corresponding measurement method given, so that the idea of the invention will become more apparent.

Referring now to FIG. 1, there is shown a GSM network architecture for supporting high speed circuit switched data HSCSD having incorporated the device according to the preferred embodiment of the invention. As can be gathered therefrom, a mobile station MS (shown on the far left) has incorporated a terminal adaptation function TAF which provides facilities to allow manual or automatic call control functions associated with alternate speech/data, speech followed by data and circuit switched data services. There are several functions included in the terminal adaptation function TAF from which, at this point, it is only important that HSCSD is supported.

The mobile station MS is connected to its respective base transceiver station BTS via the air interface AIR I/F. According to HSCSD, the connection of the mobile station MS is provided by n full-rate channels or n time slots per time division multiple access (TDMA) frame, with n being an integer. Although these n channels are physically different channels, according to HSCSD, the n full rate traffic channels at the radio interface logically belong to the same HSCSD configuration. Accordingly, the channels are controlled as one radio link for the purpose of cellular operations. Corresponding to the number of channels, the data streams are split into n separate data streams before their submission and afterwards combined together again.

The connection between the base transceiver station BTS and a respective base station controller BSC is established by an Abis interface Abis I/F and also has n traffic channels. A splitting and combining of data streams is made in the mobile station MS and in the base station controller BSC, while an allocation of channels is provided in a respective Base-station Subsystem (BSS) by the base station controller BSC.

However, when leaving the Base-station Subsystem (BSS), a transmission is submitted to a corresponding mobile services switching center MSC via an A interface A I/F, wherein a respective use of resources is restricted to one 64 kbit/s A interface A I/F circuit. Thus, the data streams of the transmission are multiplexed into that circuit.

Since one main reason for the planned introduction of HSCSD is establishing an excellent and fast data exchange with potential data service supporting networks like the PSTN and ISDN, the example depicted in FIG. 1 has an Inter Working Function IWF incorporated in the mobile services switching center MSC. This Inter Working Function IWF, however, can in principle provide links to any other network which can be another PLMN, but more likely an ISDN, a PSTN, a Packet Switched Public Data Network PSPDN or a Circuit Switched Public Data Network, or the like.

With regard to HSCSD, the Inter Working Function IWF plays an important role for a secure and fast transmission from or to the network. When a transmission is routed to the Inter Working Function IWF, it selects a free and suitable resource out of the data service unit resource pool contained in the Inter Working Function IWF for the connection to the other network. Then, the transmission is adapted and converted in the Inter Working Function IWF and finally routed to the terminated external network as ISDN or PSTN.

According to the present invention, a device MD for measuring the usage of system resources in a network is preferably located in the Mobile Services Switching Center MSC, but can optionally also be in another location suitable for measuring the above mentioned parameters, for example in the Base-station Subsystem (BSS).

Anyway, this measuring device MD measures the three above mentioned parameters of the circumstances of transmission. Radio resources used by the transmission can for example be the number of traffic channels allocated by the Base-station Subsystem (BSS) or the channel coding used during the data call. Further, the data service units selected means for example a functionality (e.g. hardware) included in the Inter Working Function IWF, in the Mobile Services Switching Center MSC itself and/or in the Base Transceiver Station BTS. Finally, the transmission characteristics can be the parameter Information Transfer Capabilities ITC, which is part of octet 3 of a bearer capability information element BCIE described in the technical specification GSM 04.08, chapter 10.5.4.5: "bearer capability" and can currently have the values: Speech; unrestricted digital information; 3,1 kHz audio, ex PLMN; facsimile group 3; other ITC. Apart from that, further enhancements are possible in the future.

With the knowledge about the nature of these parameters, several designs of means for measuring them are thinkable. It is noted, that the design of the means for measuring the parameters of the circumstance of the transmission does not need to result in three separated units. When mentioning means for each parameter separately, this should only express that the functionality for measuring each parameter separately is present. This applies in a quite similar way for means for detecting and identifying each respective dependencies of the system resource usage by a transmission in a system. This should also express a functionality with which the respective measurement results can be evaluated in the desired manner.

In this connection, it should be further noted that the presence of the evaluation means in the measuring device is not absolutely required, in contrast to the measuring means and their collective measuring nature with respect to each other. Although the functionality of the evaluation means is very advantageous for the determination of the overall characteristics of a system resource usage in a communication network, it is conceivable that this functionality is present in a location elsewhere in the network. However, the close connection between a collective measurement and the evaluation of dependencies between the measurement results makes a close physical arrangement appear desirable. From such an arrangement, for example, a reduction of the information data to be submitted from the measuring device seems to be possible.

With the measuring device being in one or the other way such present, the collective measurement of the above mentioned three parameters of the circumstance of the transmission is performed. After that, dependent on the presence of the evaluation means, there are first each respective dependencies of a system resource usage by transmissions in a system detected and identified and then respective data is submitted, or the data is immediately submitted.

The receiver of this submitted data is, according to the present invention, not limited to a particular destination. However, it is a location (physically or logically) where the data is to be handled for an analysis of the usage of system resources in the communication network and this is the location where a suitable system resource configuration for the then present overall load on the network can be dimensioned.

To be precisely, the circumstances of the transmissions are according to the aforesaid determined, i.e. that determination is based on results provided by the measuring device with or without the evaluation means. Further, also changes of said circumstances during said transmissions are determined therein. Next, an intensity of data traffic in the communication network is calculated from reservation times of the data service units used by said transmissions and from release times of said transmissions, wherein also a change of a radio channel configuration therein is considered by updating said calculation. According to the invention, this calculation can be performed separately for each of said circumstances of said transmissions, or separately for each parameter of said circumstances of said transmissions. Anyway, each dependence present between said results of said measurements, said determination steps and said calculation steps is determined thereafter. Then, the statistics including the results of the measurements, the determination steps and the calculations are generated and these generated statistics are processed for the dimensioning of suitable system resources for a usage by transmissions in a system, particularly under consideration of novelties to be introduced into the communication network.

From the foregoing it becomes fully apparent that the present invention is capable to provide an effective instrument to deal with the introduction of novelties into a communication network with respect to the dimensioning of probably additionally required system resources in that communication network. In particular, also the required system resources with respect to dynamical load changes in the network, as can appear with high speed circuit switched data HSCSD or other new channel codings to be introduced, can be determined in highly accurate manner.

Accordingly, as is described before, the present invention proposes a device for measuring a usage of system resources in a communication network, said device comprising means for measuring which radio resources are used by a transmission in a system; means for measuring which data service units are used for said transmission in a system; and means for measuring which transmission characteristics are used by said transmission in a system, wherein all of said means are adapted for a respective collective measurement, and a method for measuring a usage of system resources in a communication network, said method comprising the step of measuring parameters of circumstances of a transmission in a system, said parameters being at least radio resources used by said transmission in a system, data service units used for said transmission in a system, and transmission characteristics used by said transmission in a system, wherein said measuring is carried out collectively. According to the present invention, it is possible to provide a method for dimensioning system resources for a usage by transmissions in a communication network with this device and method for measuring the usage of system resources in a communication network.

It should be understood that the above description and accompanying figures are only intended to illustrate the present invention by way of example only. The preferred embodiments of the present invention may thus vary within the scope of the attached claims.

What is claimed is:

1. A device for measuring usage of system resources in a communication network, the device comprising:
   means for measuring which radio resources are used by a transmission in a system, wherein the transmission is a communication session that represents a logical association between a terminal and at least one of a plurality of network entities;
   means for measuring which data service units are used for the transmission in the system; and means for measuring which transmission characteristics are used by the transmission in the system, wherein all of the means for measuring are adapted for performing respective collective measurement.

2. The device according to claim 1, wherein said transmission characteristics comprise an information transfer capability information.

3. The device according to claim 1, further comprising means for evaluating, detecting and identifying respective dependencies of said system resource usage by evaluating measurement results of said means for measuring.

4. The device according to claim 1, wherein said device is part of a switching center of the communication network.

5. The device according to claim 1, wherein said device is part of a base-station subsystem of the communication network.

6. The device according to claim 1, wherein the transmission contains high speed circuit switched data.

7. The device according to claim 1, wherein the transmission contains data which is channel coded according to Enhanced Data rates for GSM Evolution.

8. A method for measuring a usage of system resources in a communication network, the method comprising measuring parameters of circumstances of a transmission in a system, wherein the transmission is a communication session that represents a logical association between a terminal and at least one of a plurality of network entities, said parameters being at least radio resources used by the transmission in a system, data service units used for the transmission in a system, and transmission characteristics used by the transmission in a system, wherein said measuring is carried out collectively.

9. The method according to claim 8, wherein the transmission characteristics comprise an information transfer capability information.

10. The method according to claim 8, further comprising detecting and identifying respective dependencies of system resource usage.

11. The method according to claim 8, wherein the measurements are carried out in a switching center of the communication network.

12. The method according to claim 8, wherein the measurements are carried out in a base-station subsystem of the communication network.

13. The method according to claim 8, wherein the transmission contains high speed circuit switched data.

14. The method according to claim 8, wherein the transmission contains data which is channel coded according to Enhanced Data rates for GSM Evolution.

15. A method for dimensioning system resources for a usage by transmissions in a system, the method comprising:

determining circumstances of transmissions as well as changes in circumstances of transmissions in a system;

calculating separately for each transmission circumstance an intensity of data traffic in a communication network from reservation times of data service units used by transmissions and from release times of transmissions;

considering a change of a radio channel configuration by updating the calculation performed separately for each transmission circumstance;

determining dependencies based upon results of measurements, determinations and calculations;

generating statistics based upon results of measurements, determinations and calculations; and processing generated statistics for dimensioning system resources for usage by transmission in the system.

16. The method according to claim 15, wherein calculations are performed separately for each parameter corresponding to transmission circumstances as well as to a change of transmission circumstances.

* * * * *